United States Patent
Yin et al.

(10) Patent No.: US 11,281,625 B1
(45) Date of Patent: Mar. 22, 2022

(54) RESOURCE MANAGEMENT SERVICE

(71) Applicant: Amazon Technologies, Inc., Seattle, WA (US)

(72) Inventors: Si Yin, Seattle, WA (US); Julio Delgado Mangas, Redmond, WA (US); Omer Baluch, Seattle, WA (US); Ajay Gopalakrishnan, Bellevue, WA (US); Kiran-Kumar Muniswamy-Reddy, Sammamish, WA (US); Mukul Vijay Karnik, Redmond, WA (US); Vishal Parakh, Seattle, WA (US); Antoun Joubran Kanawati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 950 days.

(21) Appl. No.: 15/614,023

(22) Filed: Jun. 5, 2017

(51) Int. Cl.
| | |
|---|---|
| *G06F 16/14* | (2019.01) |
| *G06F 16/953* | (2019.01) |
| *G06F 16/245* | (2019.01) |
| *G06F 16/248* | (2019.01) |
| *G06F 16/951* | (2019.01) |
| *G06F 16/835* | (2019.01) |

(52) U.S. Cl.
CPC .......... *G06F 16/144* (2019.01); *G06F 16/245* (2019.01); *G06F 16/953* (2019.01); *G06F 16/248* (2019.01); *G06F 16/8373* (2019.01); *G06F 16/951* (2019.01)

(58) Field of Classification Search
CPC .... G06F 16/144; G06F 16/951; G06F 16/245; G06F 16/953
USPC .......................................................... 707/718
See application file for complete search history.

(56) References Cited

U.S. PATENT DOCUMENTS

| | | | | |
|---|---|---|---|---|
| 8,606,814 | B2* | 12/2013 | Graf ...................... | G06F 16/283 |
| | | | | 707/770 |
| 8,725,730 | B2* | 5/2014 | Keeton ............... | G06F 16/2462 |
| | | | | 707/736 |
| 9,705,817 | B2* | 7/2017 | Lui ...................... | H04L 43/0817 |
| 10,216,512 | B1* | 2/2019 | Mathew .................... | G06F 8/41 |
| 2003/0110242 | A1* | 6/2003 | Brown .................... | H04L 29/06 |
| | | | | 709/222 |
| 2005/0278332 | A1* | 12/2005 | Petev ...................... | G06F 16/10 |
| 2008/0052720 | A1* | 2/2008 | Barsness ........... | G06F 16/24542 |
| | | | | 718/104 |
| 2011/0191324 | A1* | 8/2011 | Wang ...................... | G06F 16/00 |
| | | | | 707/718 |
| 2012/0150791 | A1* | 6/2012 | Willson ................ | G06F 16/254 |
| | | | | 707/600 |
| 2012/0150842 | A1* | 6/2012 | Ruiz ................... | G06F 16/2423 |
| | | | | 707/718 |
| 2012/0227038 | A1* | 9/2012 | Hunt ................... | G06F 9/45558 |
| | | | | 718/1 |
| 2012/0259436 | A1* | 10/2012 | Resurreccion ..... | G05B 23/0216 |
| | | | | 700/17 |

(Continued)

*Primary Examiner* — Shahid A Alam
(74) *Attorney, Agent, or Firm* — Davis Wright Tremaine LLP

(57) ABSTRACT

A resource management service implements techniques for provisioning a process with computing resources sufficient to process a query. A query is received and computing system resources sufficient to process the query are provisioned. A response to the query is generated by running the process with the provisioned computing system resources.

20 Claims, 9 Drawing Sheets

(56) References Cited

U.S. PATENT DOCUMENTS

| | | | | |
|---|---|---|---|---|
| 2013/0311615 A1* | 11/2013 | Aleksandrov | ............. | G06F 8/65 709/219 |
| 2014/0189125 A1* | 7/2014 | Amies | ................. | G06F 9/45558 709/226 |
| 2014/0258238 A1* | 9/2014 | Jin | ...................... | G06F 9/45558 707/649 |
| 2015/0379083 A1* | 12/2015 | Lang | ................. | G06F 16/24526 707/722 |
| 2016/0188594 A1* | 6/2016 | Ranganathan | .... | G06F 16/24552 707/769 |
| 2016/0246626 A1* | 8/2016 | Kolesnik | ............. | G06F 9/45558 |
| 2016/0254964 A1* | 9/2016 | Bene | ....................... | H04L 41/12 709/223 |
| 2016/0321352 A1* | 11/2016 | Patel | ................... | G06F 16/1734 |
| 2017/0060609 A1* | 3/2017 | Cropper | ................ | G06F 16/285 |
| 2017/0111236 A1* | 4/2017 | Bielenberg | .......... | G06F 9/45558 |
| 2017/0193099 A1* | 7/2017 | Ben-Tzur | ............. | G06F 16/332 |

\* cited by examiner

RESOURCE MANAGEMENT SERVICE

BACKGROUND

Computer users seeking to reduce the expense and overhead associated with maintaining their own computing resources have turned to purchasing computing services offered by computing resource service providers. Such computing services are often configurable and scalable to meet various computing needs of the computer users and to provide high availability. The use of hosted computing service and storage has proliferated in recent years where the resources for network computing and storage are often provided by computing resource providers that leverage large-scale networks of computer systems to host and execute a variety of applications and services. This variety of applications and services can provide a significant number of potential solutions for a particular problem, some of which may be query-based applications and services where computer users generate queries to the application or service and receive responses generated by the application or service. Balancing the available resources of computer systems of the computing resource service provider to generate query responses in an efficient manner can be challenging.

BRIEF DESCRIPTION OF THE DRAWINGS

Various techniques will be described with reference to the drawings, in which.

DETAILED DESCRIPTION

Figure 1:
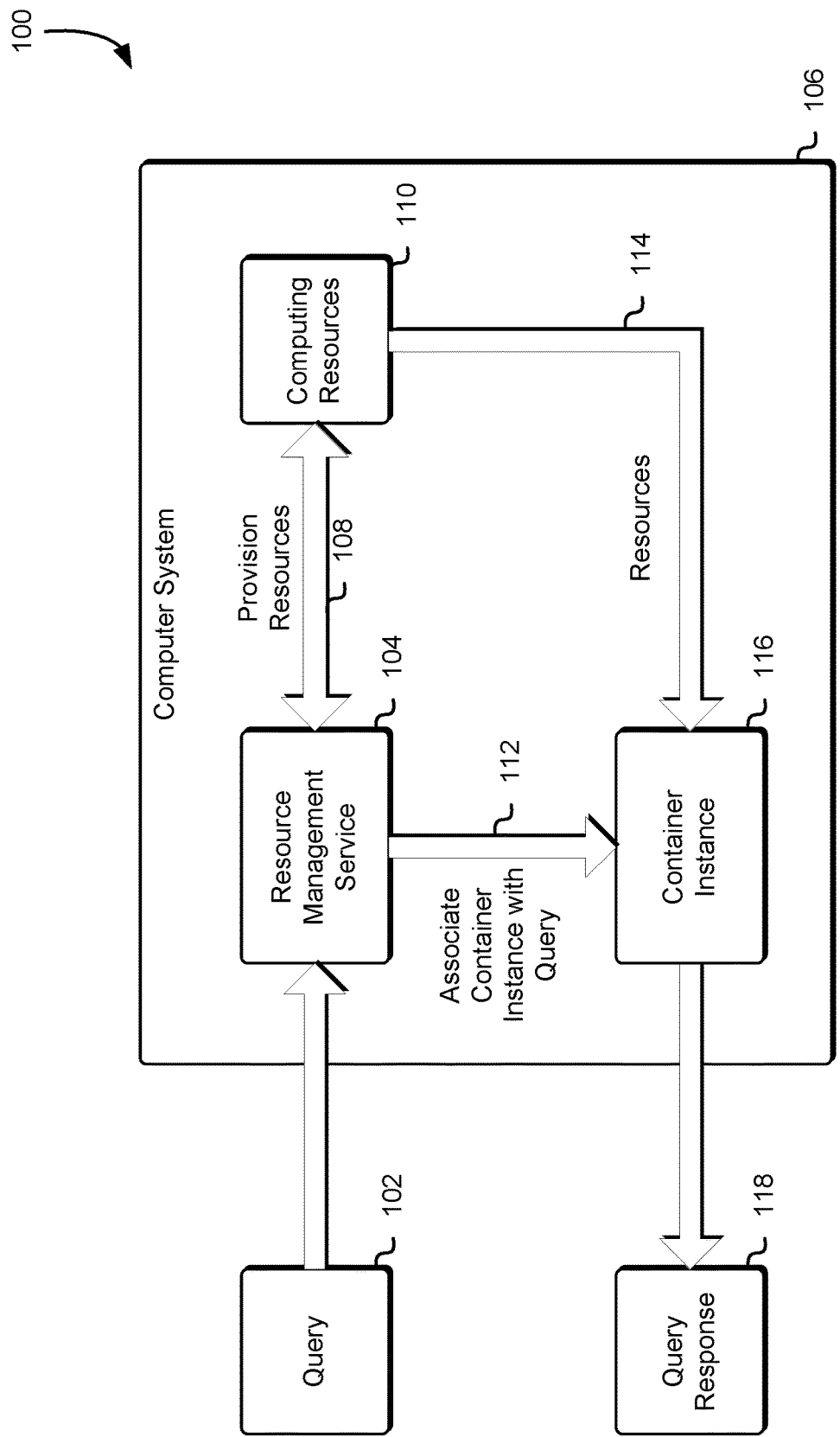
FIG. 1 illustrates an example system where resources for a container instance are provisioned by a resource management service in accordance with one embodiment.

A computing resource service provider, in one embodiment, provides customers with access to various computing resources to execute and/or operate applications on behalf of the customers who frequently use query-based services where the customer generates queries to the services and the query-based services generate responses to those queries. In one embodiment, a query-based service is a database service where a customer can generate database queries to read, write, store, and analyze data. In one embodiment, a query-based service is a webservice where a customer can generate webservice queries to display, alter, update, and otherwise manipulate webservice data. Other examples of query-based services include, but are not limited to, data archiving services, data visualization services, authorization services, authentication services, and the like. In one embodiment, such query-based services are used by other services and applications operating within the computing resource service provider environment. In one embodiment, such query-based services are used by other services and applications operating within an environment provided by the customer. In one embodiment, such query-based services are used by other services and applications operating within an environment that is provided by a third-party (i.e., neither the computing resource service provider nor the customer environment). In one embodiment, such query-based services are used by other services and applications operating within a combination of computing resource service provider, customer, and third-party environments.

In one embodiment, a query-based service receives queries (e.g., from a customer, a user, a service, or an application) and distributes the queries to computer system hardware operating within the computing resource service provider environment for processing. In one embodiment, the queries are provided directly to the computer system hardware operating within the computing resource service provider environment.

In one embodiment, as a result of a query being received at the computer system hardware, a resource management service operating on the computer system hardware receives the query and determines the resources that are sufficient to process the query. In one embodiment, the resource management service analyzes the query and, based at least in part on the type and scope of the query, determines the resources that are sufficient to process the query. In one embodiment, the resource management service predetermines a minimal set of resources that are sufficient to process the query so that at least that amount of resources are associated with the process or container instance to process the query. In one embodiment, the resource management service predetermines a number of different query categories or types and determines the amount of resources that are sufficient to process the query based at least in part on classifying the query according to such categories or types. In one embodiment, the resource management service adjusts such predetermined categories and/or the minimal set of resources based at least in part on monitoring processes or container instances as queries are received and processed.

In one embodiment, the resources that are sufficient to process the query include resources such as central processing unit ("CPU") time, CPU percentage, memory, network bandwidth, storage, file descriptors, or access to other services of the computing resource service provider. In one embodiment, the resource management service requests access to such resources from the operating system of the computer system. In one embodiment, the resource management service directly accesses such resources without requesting access to such resources from the operating system of the computer system.

In one embodiment, the resources that are sufficient to process the query include specialized hardware of the computer system such as a graphics processing unit ("GPU"), an application-specific integrated circuit ("ASIC"), a field-programmable gate array ("FPGA"), a trusted platform module ("TPM"), or other such specialized hardware. In one embodiment, the resource management service controls access to such specialized hardware resources on behalf of the operating system of the computer system by requesting such control from the operating system of the computer system.

In one embodiment, when the resource management service determines the resources that are sufficient to process the query, the resource management service associates a process of the computer system with the resources that are sufficient to process the query by assigning the resources that are sufficient to process the query to the process. When assigning the resources that are sufficient to process the query to the process of the computer system, the resource management service associates the resources (e.g., CPU time, CPU percentage, memory, network bandwidth, storage, file descriptors, access to other services of the computing resource service provider, and/or access to specialized hardware) to the process and maintains such associations until such time as those resources are no longer being used by the process of the computer system to process the query and generate the query response.

In one embodiment, the process of the computer system that is used to process the query and generate a response to the query is a container instance, as described herein.

In one embodiment, when the resource management service determines the resources that are sufficient to process the query, the resource management service associates a container instance with the resources that are sufficient to process the query by assigning the resources that are sufficient to process the query to the container instance. When assigning the resources that are sufficient to process the query to the container instance, the resource management service associates the resources (e.g., CPU time, CPU percentage, memory, network bandwidth, storage, file descriptors, access to other services of the computing resource service provider, and/or access to specialized hardware) to the container instance and maintains such associations until such time as those resources are no longer being used by the container instance to process the query and generate the query response.

In one embodiment, when the resource management service determines the resources that are sufficient to process the query and associates a process or container instance of the computer system with the resources that are sufficient to process the query, the resource management service then causes the process or container instance to be instantiated with the resources to generate a response to the query. A process or container instance is instantiated with the resources that are sufficient to process the query, data to process the query, and any executable instructions to process the query (as described herein) so that, when instantiated, the process or container instance can execute the executable instructions to generate a response to the query.

In one embodiment, the response to the query is sent by the process to the query-based service and, in turn, is sent to the customer, user, service, or application that generated the query. In one embodiment, the response to the query is sent by the process directly to the customer, user, service, or application that generated the query.

In one embodiment, the resource management service monitors each process or container instance that is instantiated in response to a query to determine whether there is a change in the resources sufficient to process the query. In one embodiment, the resource management service monitors a process or container instance that is instantiated in response to a query and, if the resource management service determines through such monitoring that the resources are insufficient to process the query (i.e., there are not enough of one or more of the resources), the resource management service reprovisions the process or container instance with additional resources. In one embodiment, the resource management service monitors a process or container instance that is instantiated in response to a query and, if the resource management service determines through such monitoring that the resources are considerably more than sufficient to process the query (i.e., there is too much of one or more of the resources), the resource management service reprovisions the process or container instance with fewer resources (i.e., the resource management service removes some of the resources). In one embodiment, the resource management service monitors a process or container instance that is instantiated in response to a query and, if the resource management service determines through such monitoring that the process or container instance has completed execution, the resource management service reclaims the resources from the process or container instance so that the resources can be used for other processes or container instances.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example system 100 where resources for a container instance are provisioned by a resource management service in accordance with an embodiment. As illustrated in FIG. 1, in one embodiment, a query 102 is received at a resource management service 104 operating on a computer system 106. In one embodiment, the query 102 is received from a user or customer as described herein. In one embodiment, the query 102 is received from a service or application as described herein. In one embodiment, the query 102 is received from a query-based service such as a database service that distributes the query 102 to the resource management service 104.

In one embodiment, the resource management service 104 is a service provided by a computing resource service provider (such as the computing resource service provider 212 described in connection with FIG. 2) to receive queries such as the query 102 and provision resources to process the received queries on computer system hardware provided by a computing resource service provider. In one embodiment, the resource management service 104 is a process or service that uses computing resources 110 of the computer system 106 to receive queries such as the query 102 and provision resources to process the received queries on computer system hardware provided by a computing resource service provider. These computing resources of the computer system are configured to receive queries such as the query 102 and provision resources to process the received queries on computer system hardware provided by a computing resource service provider. The resources, which in an embodiment are the same as the resources provided by the resource management service to provision processes and/or container instances as described herein, include at least one of: computer systems (the computer systems including processors and memory), networks, storage devices, executable code, services, processes, modules, or applications.

In one embodiment, the computing resources configured receive queries such as the query 102 and provision resources to process the received queries on computer system hardware provided by a computing resource service provider include virtual systems that are implemented on shared hardware hosted by a computing resource service provider. In one embodiment, the resource management service 104 is implemented as a single system on a single computer system 106. In one embodiment, the resource management service 104 is implemented as a distributed system, with a plurality of instances operating on multiple computer systems to receive queries such as the query 102 and provision resources to process the received queries on computer system hardware provided by a computing resource service provider. In one embodiment, the resource management service 104 operates using external computing resources (e.g., databases and/or virtual machine instances) that enable the resource management service 104 to receive queries such as the query 102 and provision resources to process the received queries on computer system hardware provided by a computing resource service provider.

In one embodiment, the resource management service 104 maintains data and/or metadata such that when a query such as the query 102 is received, the data and/or metadata is located, processed, and provided (or a streaming data object is initiated) for use in processing the query. In one embodiment, the data and/or metadata maintained by the resource management service 104 is organized as data objects. In one embodiment, these data objects have arbitrary sizes. In one embodiment, these data objects have constraints on size or durability. Thus, in one embodiment, the resource management service 104 is configured to manage numerous data objects of varying sizes. In one embodiment, the resource management service 104 stores the data objects in storage resources controlled by the resource management service 104. In one embodiment, the resource management service 104 stores the data objects using resources controlled by some other service such as a data storage service. In one embodiment, the resource management service 104 stores the data objects using a combination of storage locations. In one embodiment, the resource management service 104 operates as a key value store that associates the data objects with identifiers of the data objects that are used to retrieve or perform other operations in connection with the data objects. In one embodiment, the resource management service 104 generates metadata associated with the data objects and uses such metadata to receive queries such as the query 102 and provision resources to process the received queries on computer system hardware provided by a computing resource service provider.

In one embodiment, the resource management service 104 receives the query 102 and analyzes the query 102 and provisions a set of resources 108 of the set of computing resources 110 associated with the computer system 106 that are sufficient to process the query 102. In one embodiment, the resource management service 104 analyzes the query 102 and, based at least in part on the type and scope of the query 102, provisions a set of resources 108 of the set of computing resources 110 associated with the computer system 106 that are sufficient to process the query 102. In one embodiment, the resource management service 104 predetermines a minimal set of resources that are sufficient to process the query 102 so that at least that amount of resources are associated with the process or container instance to process the query. In such an embodiment, the resource management service 104 provisions a set of resources 108 of the set of computing resources 110 associated with the computer system 106 that are sufficient to process the query 102 and that are greater than the minimal set of resources.

In one embodiment, the resource management service 104 predetermines a number of different query categories or types and provisions a set of resources 108 of the set of computing resources 110 associated with the computer system 106 that are sufficient to process the query 102 based at least in part on classifying the query 102 according to such categories or types. In one embodiment, the resource management service 104 adjusts such predetermined categories and/or the minimal set of resources based at least in part on monitoring processes or container instances as a plurality of queries are received and processed.

In one embodiment, the computing resources 110 include CPU time (e.g., the amount of CPU time that the query is allocated). In one embodiment, the computing resources 110 include CPU percentage (e.g., the percentage of CPU capacity that the query is allocated). In one embodiment, the computing resources 110 include computer system memory (e.g., the amount of memory that the query is allocated). In one embodiment, the computing resources 110 include network bandwidth (e.g., the amount or percentage of network bandwidth that the query is allocated). In one embodiment, the computing resources 110 include computer system storage (e.g., the amount of permanent and/or temporary storage that the query is allocated). In one embodiment, the computing resources 110 include file descriptors (e.g., the number of file descriptors for computer system files that the query is allocated). In one embodiment, the computing resources 110 include access to other services of the computing resource service provider (e.g., access to services of the computing resource service provider that are used by the resource management service 104 to process queries). In one embodiment, the resource management service 104 requests access to such resources from the operating system of the computer system 106. In one embodiment, the resource management service 104 directly accesses such resources without requesting access to such resources from the operating system of the computer system 106.

In one embodiment, the computing resources 110 include specialized hardware of the computer system 106 including, but not limited to, a GPU, an ASIC, an FPGA, or a TPM. In one embodiment, the resource management service 104 controls access to such specialized hardware resources on behalf of the operating system of the computer system 106 by requesting such control from the operating system of the computer system.

In one embodiment, when the resource management service 104 provisions a set of resources 108 of the set of computing resources 110 associated with the computer system 106 that are sufficient to process the query 102, the resource management service 104 associates 112 a container instance 116 with the query 102 and assigns the resources 114 to the container instance 116. Although not illustrated in FIG. 1, in one embodiment, when the resource management service 104 provisions a set of resources 108 of the set of computing resources 110 associated with the computer system 106 that are sufficient to process the query 102, the resource management service 104 associates a process of the computer system 106 with the query 102 and assigns the resources 114 to the process. As used herein, a container instance 116 is an example of a process of the computer system that is configured to receive the query 102 and process the query 102 using executable instructions that are included in the container instance 116.

In one embodiment, a container instance 116 is a lightweight, virtualized execution environment for applications that are configured to be frequently reused, that typically have a short lifetime, and that execute applications to process the query 102. A container instance 116 provides an environment for efficient implementation of tasks that are executed on computer systems and applications that efficiently cohabitate on a same physical or virtual instance of a computing device such as the computer system 106. Container instances can be quickly and efficiently instantiated on instances with software specified to perform a specific part of a specific task included in the container such as the task to process the query 102. In one embodiment, a container instance 116 is instantiated for each query 102. In one embodiment, a process is instantiated for each query 102.

In one embodiment, containers are managed by the resource management service 104 that functions as a container instance management service. In one embodiment, a separate container instance management service operates on the computer system or on another computer system. In one embodiment, the service that operates as a container instance management service is a collection of computing resources that operate collectively to manage container instances where queries can be processed. In one embodiment, the computing resources configured to manage container instances where queries can be processed include at least one of: computer systems (the computer systems including processors and memory), networks, storage devices, executable code, services, processes, modules, or applications. In one embodiment, the computing resources configured to manage container instances where queries can be processed include virtual systems that are implemented on shared hardware hosted by a computing resource service provider.

In one embodiment, the service that operates as a container instance management service is implemented as a single system. In one embodiment, the service that operates as a container instance management service is implemented as a distributed system, with a plurality of instances operating collectively to manage container instances where queries can be processed. In one embodiment, the service that operates as a container instance management service operates using other services that enable the service to instantiate container instances, communicate with container instances, and/or otherwise manage container instances.

In one embodiment, a container instance 116 is a computer system instance that is configured to process queries such as the query 102. In one embodiment, the container instance 116 is configured to run tasks in accordance with the query 102. In one embodiment, one or more container instances comprises an isolated cluster or group of container instances where the container instances within the cluster are able to communicate with each other but are not able to communicate with container instances outside of the cluster. In one embodiment, each container instance 116 of the computing system 106 is isolated from each other container instance of the computing system 106.

As described above, a container instance is a lightweight virtual machine instance running on the computer system 106 that includes programs, data, and/or system libraries. When the container instance is executed, the programs are isolated from other processes running in the same computer system 106. Thus, container instances each require resources to operate (e.g., the computing resources 110) of the computer system 106 and execute in isolation from each other (e.g., each container has an individualized view of the file system of the computer system 106). In one embodiment, each of the container instances has its own namespace, and applications running within the container instance are isolated by only having access to resources available within the container namespace.

In one embodiment, the container instances such as the container instance 116 are launched with specified resources from resources allocated to the container instance by the resource management service 104. In an illustrative example, a container instance is launched with a specified amount of memory according to the provisioned resources, and the container instance cannot utilize more than that specified amount of memory unless the resource management service 104 provisions additional memory to that container instance, as described herein. In one embodiment, multiple container instances run simultaneously on the computer system 106, and the resources 110 of the computer system are allocated efficiently between the container instances using this resource management service 104. In one embodiment, a computer system 106 supports running container instances from only one customer (referred to herein as a "single-tenant" environment). In one embodiment, a computer system 106 supports running container instances from multiple customers (referred to herein as a "multi-tenant" environment). In the multi-tenant environment, the service operating as the container management service provides security to ensure that the customers are unable to access container instances of other customers. In one embodiment, container instances are instantiated as needed (e.g., as queries are received). In one embodiment, container instances are maintained in a pool of container instances that are already running and that are configured to process queries as the queries are received.

In one embodiment, after the container instance 116 is instantiated and provisioned with resources 114 as described above, the container instance is executed and a query response 118 is provided. In one embodiment, the container instance 116 processes the query by executing computer-executable instructions included in the container instance 116 using the resources 114 provisioned by the resource management service 104.

Figure 2:
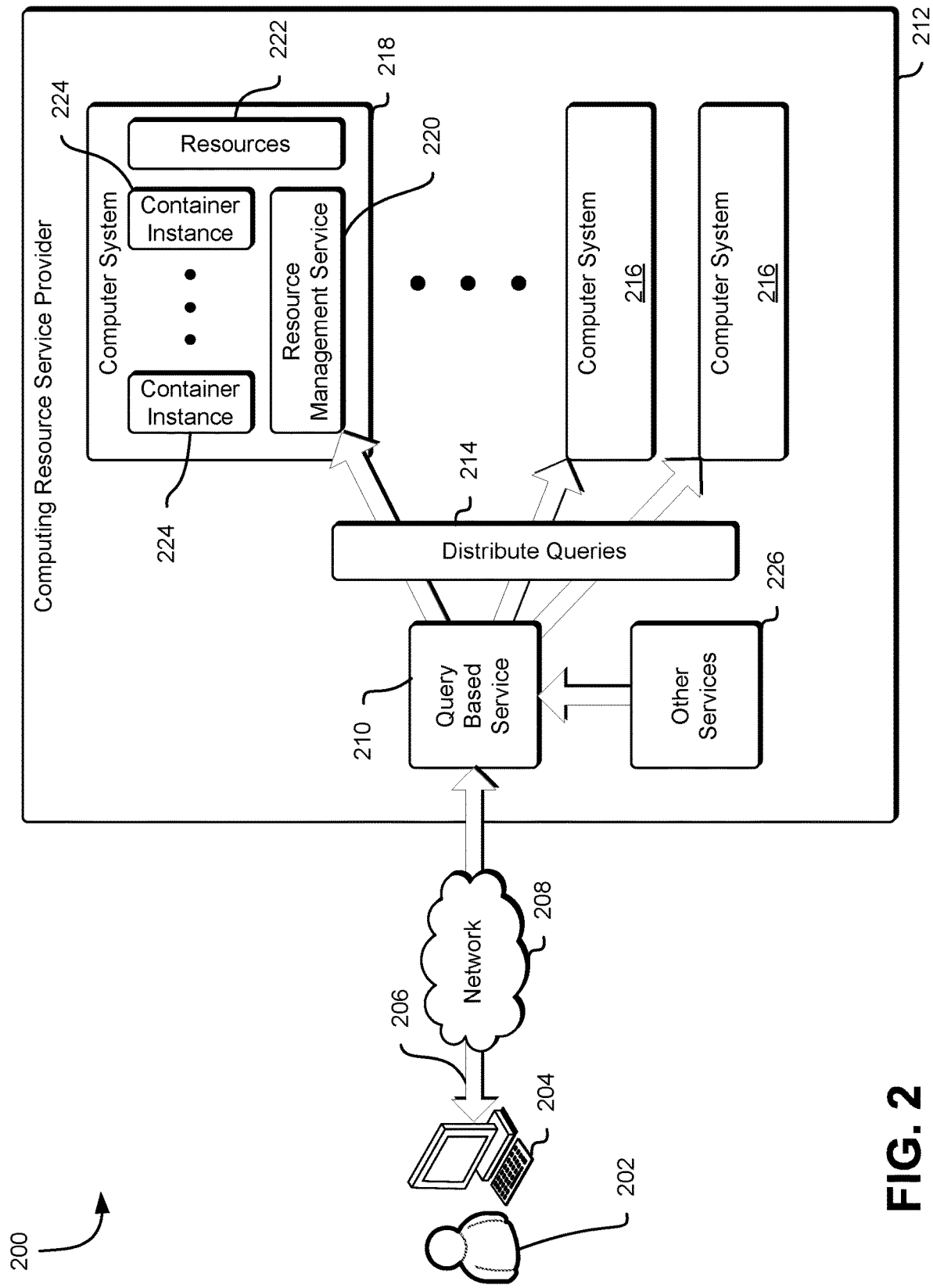
FIG. 2 illustrates an example system where a query-based service distributes queries to computer systems configured with a resource management service in accordance with one embodiment.

FIG. 2 illustrates an example system 200 where a query-based service distributes queries to computer systems configured with a resource management service as described in connection with FIG. 1 and in accordance with an embodiment. As illustrated in FIG. 2, in one embodiment, a user 202 uses a computing device 204 to connect 206 to a query-based service 210 of a computing resource service provider 212 using a network 208 and, although not illustrated in FIG. 2, generates one or more queries that are sent to the query-based service 210 as described above in connection with FIG. 1.

In one embodiment, the user 202 associated with the computing resource service provider 212 issues a command from the client computing device 204 that generates queries that are sent to the query-based service 210 via the network 208 such as those networks described herein. As described herein, a computing resource service provider 212 provides a distributed, virtualized, and/or datacenter environment within which one or more applications, processes, services, virtual machines, and/or other such computer system entities are executed. In one embodiment, the user 202 is a process running on one or more remote computer systems controlled by a customer of the computing resource service provider 212.

In one embodiment, commands to the computing resource service provider 212 that cause a query to be generated originate from an outside computer system. In one embodiment, commands to the computing resource service provider 212 that cause a query to be generated originate from within the computing resource service provider 212 environment (e.g., from the other services 226, as described herein). In one embodiment, the commands that cause a query to be generated are sent to the computing resource service provider 212 without the direct intervention of the user 202 (i.e., commands that cause a query to be generated are executed automatically in response to one or more events). In one embodiment, the user 202 connects to the computing resource service provider 212 using a privileged user account associated with a customer of the computing resource service provider 212. In one embodiment, the user 202 uses a privileged user account associated with and/or provided by the computing resource service provider 212.

In one embodiment, the container instance (e.g., the container instance 224) provides the response to the query to the client computing device 204 of the user 202 using the techniques described herein.

In one embodiment, the computing resource service provider 212 provides access to one or more host machines hosted by the computing resource service provider 212. In one embodiment, the computing resource service provider 212 provides access to one or more services in an environment therein. In one embodiment, the one or more services provided by the computing resource service provider 212 are implemented as and/or utilize one or more virtual machine instances that are operating on host machines operating within the computing resource service provider 212 environment. In one embodiment, the computing resource service provider 212 provides a variety of services to users (e.g., the user 202) and/or customers of the computing resource service provider 212. In one embodiment, the users and/or customers of the computing resource service provider 212 communicate with the computing resource service provider 212 via an interface such as a web services interface or using some other type of interface. In one embodiment, each of the services operating in an environment of the computing resource service provider 212 has its own interface and, generally, subsets of the services can have corresponding interfaces in addition to or as an alternative to the single interface.

In one embodiment, the user 202 interacts with services of the computing resource service provider 212 (via appropriately configured and authenticated API requests) using a client computing device such as the client computing device 204 to provision and operate services that are instantiated on physical computing devices hosted and operated by the computing resource service provider 212 as described herein. These services are configured to manage resources (e.g., storage, processors, memory, network, etc.) associated with the services. These resources are used for various purposes, such as to operate as servers supporting a website, to operate business applications or, generally, to serve as computing power for the user 202. Other applications of the services can support database applications, electronic commerce applications, business applications, and/or other such applications.

In one embodiment, the query-based service 210 distributes the queries 214 to one or more computer systems such as the computer systems 216 and the computer system 218. In the example illustrated in FIG. 2, the computer system 218 is a detailed illustration of one of the computer systems 216. In one embodiment, the query-based service 210 is a database service. In one embodiment, the query-based service 210 distributes the queries 214 using one or more load-balancing techniques to distribute the queries from one or more users such as the user 202 to the computer systems 216 and the computer system 218. As illustrated in FIG. 2, in one embodiment, the query-based service 210 also receives and distributes the queries 214 from one or more other services 226 of the computing resource service provider 212.

In one embodiment, the computer system 218 (which is a detailed illustration of one of the computer systems 216) receives the distributed query at a resource management service 220 and instantiates a container instance 224 using resources 222 of the computer system 218. Each of the computer systems 216 also receive distributed queries at a resource management service (not illustrated) and instantiate container instances (also not illustrated) using resources (also not illustrated) of the respective computer system. In one embodiment, there is one resource management service operating on each of the computer systems 216 and on the computer system 218.

Figure 3:
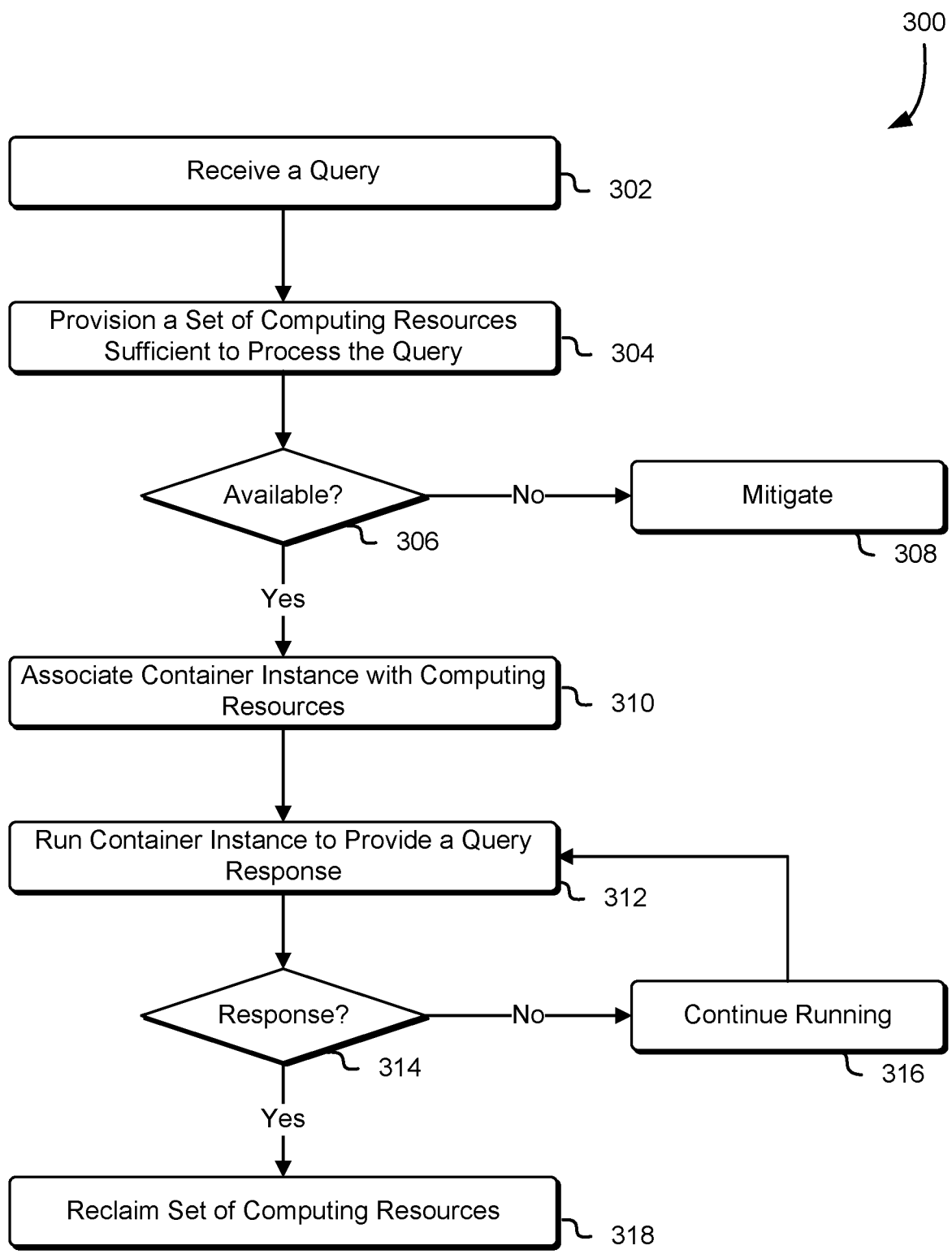
FIG. 3 illustrates an example process for provisioning resources using a resource management service in accordance with one embodiment.

FIG. 3 illustrates an example process 300 for provisioning resources using a resource management service in accordance with an embodiment. A resource management service such as the resource management service 104 described in connection with FIG. 1 may perform the example process 300 described in connection with FIG. 3. In one embodiment, the resource management service receives 302 a query as described herein. In one embodiment, the resource management service receives 302 a query from a query-based service as described herein. In one embodiment, the resource management service receives 302 a query directly from a user. In one embodiment, the resource management service receives 302 a query from another service of, for example, the computing resource service provider environment.

In one embodiment, the resource management service provisions 304 a set of computing resources sufficient to process the query. In one embodiment, the resource management service provisions 304 the set of computing resources sufficient to process the query by analyzing the query, determining minimum resource requirements associated with the query, and requesting resources corresponding to the minimum resource requirements associated with the query. In one embodiment, the resource management service requests the resources corresponding to the minimum resource requirements associated with the query from the operating system of a computer system. In one embodiment, the resource management service requests the resources corresponding to the minimum resource requirements associated with the query from a pool of computing resources managed by the resource management service.

In one embodiment, the resource management service determines 306 if the resources corresponding to the minimum resource requirements associated with the query are available. In an illustrative example, the resources corresponding to the minimum resource requirements associated with the query include 10% of a CPU and 1 megabyte of memory. If the computer system does not have at least 10% of a CPU and 1 megabyte of memory available (because, for example, other container instances and/or processes are running on the computer system), the resource management service may determine that the resources corresponding to the minimum resource requirements associated with the query are not available. Conversely, if the computer system does have at least 10% of a CPU and 1 megabyte of memory available, the resource management service may determine that the resources corresponding to the minimum resource requirements associated with the query are available.

In one embodiment, if the resource management service determines 306 that the resources corresponding to the minimum resource requirements associated with the query are not available, the resource management service performs one or more operations to mitigate 308 the condition where the resources corresponding to the minimum resource requirements associated with the query are not available. In one embodiment, the resource management service performs one or more operations to mitigate 308 the condition where the resources corresponding to the minimum resource requirements associated with the query are not available by delaying the query until the resources corresponding to the minimum resource requirements associated with the query become available. In one embodiment, the resource management service performs one or more operations to mitigate 308 the condition where the resources corresponding to the minimum resource requirements associated with the query are not available by issuing an error to the user. In one embodiment, the resource management service performs one or more operations to mitigate 308 the condition where the resources corresponding to the minimum resource requirements associated with the query are not available by issuing an error to the query-based service, so that the query-based service can perform one or more operations to mitigate the condition where the resources corresponding to the minimum resource requirements associated with the query are not available at the computer system.

In one embodiment, if the resource management service determines 306 that the resources corresponding to the minimum resource requirements associated with the query are available, the resource management service associates 310 a container instance with the resources corresponding to the minimum resource requirements associated with the query. Although not illustrated in FIG. 3, in one embodiment, if the resource management service determines 306 that the resources corresponding to the minimum resource requirements associated with the query are available, the resource management service associates a process of the computer system with the resources corresponding to the minimum resource requirements associated with the query. The resource management service associates 310 a container instance with the resources corresponding to the minimum resource requirements associated with the query (or associates a process with the resources corresponding to the minimum resource requirements associated with the query) by assigning the resources to the container instance or process (also referred to herein as reserving the resources for the container instance or process).

In one embodiment, the resource management service runs 312 the container instance to provide a query response by, for example, executing executable instructions of the container instance to process the query. In one embodiment, the resource management service determines 314 if a response has been generated by the container instance. In an embodiment, if the resource management service determines 314 that a response has not been generated, the resource management service continues 316 running the container instance. Although not illustrated in FIG. 3, in an embodiment, the resource management service continues 316 running the container instance for a predetermined amount of time and, in such an embodiment, generates an error response if that predetermined amount of time is exceeded. In an embodiment, if the resource management service determines 314 that a response has been generated, the resource management service reclaims 318 the set of computing resources for use in other queries as described herein.

It should be noted that one or more of the operations performed in the example process 300 described in connection with FIG. 3 may be performed in various orders and combinations, including, but not limited to, in parallel.

Figure 4:
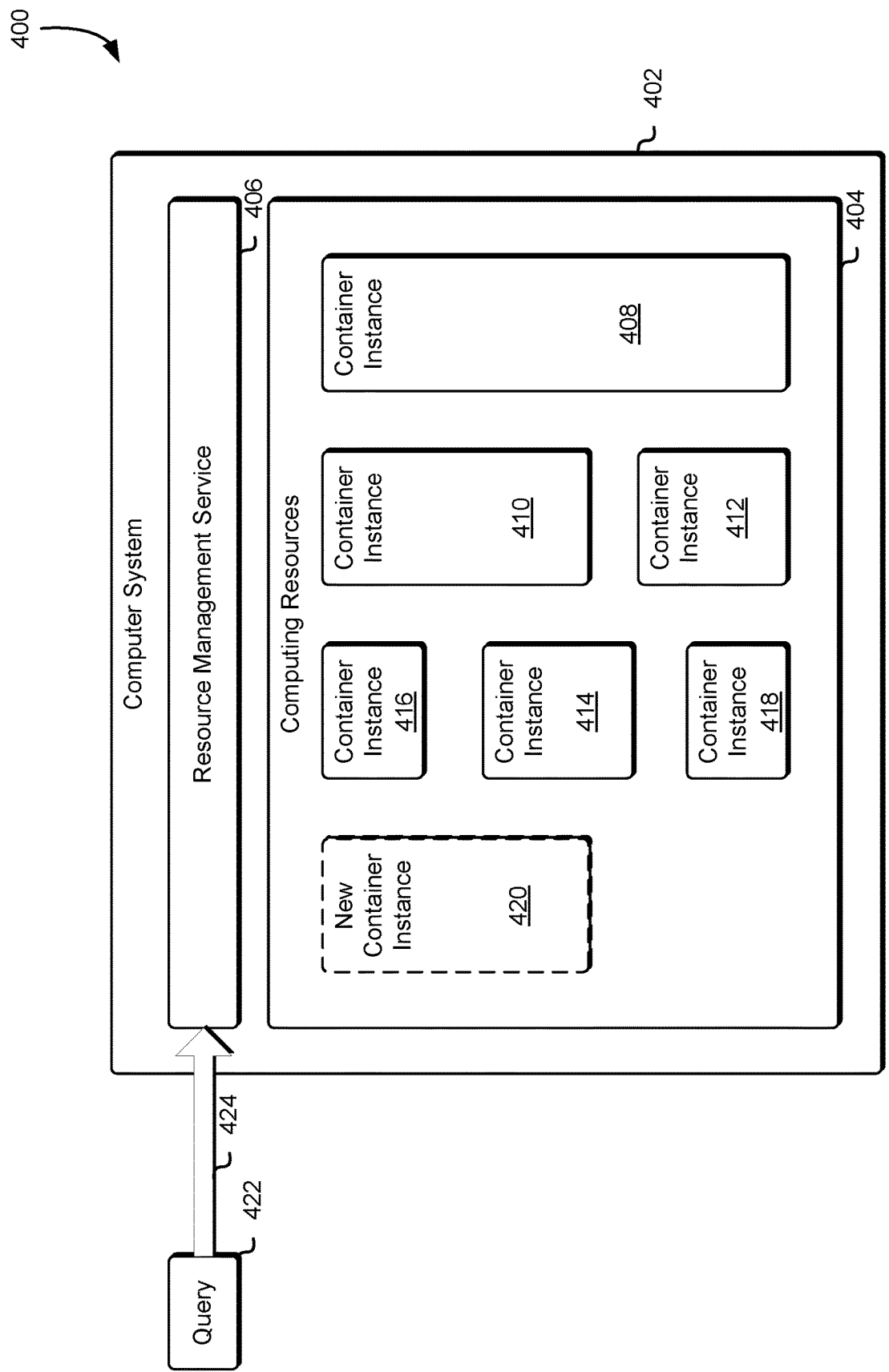
FIG. 4 illustrates an example system where a new container instance is instantiated to provide a response to a query using a resource management service in accordance with one embodiment.

FIG. 4 illustrates an example system 400 where a new container instance is instantiated to provide a response to a query using a resource management service as described in connection with FIG. 1 and in accordance with an embodiment. As illustrated in FIG. 4, in one embodiment, a query 422 is received 424 at a resource management service 406 operating on a computer system 402 as described herein. In one embodiment, a container instance 408 has a large amount of provisioned resources of the computing resources 404 of the computer system 402. In one embodiment, a container instance 410 has a smaller amount of provisioned resources of the computing resources 404 of the computer system 402. In one embodiment, a container instance 412 and a container instance 414 each have a still smaller amount of provisioned resources of the computing resources 404 of the computer system 402. In one embodiment, a container instance 416 and a container instance 418 each have a still smaller amount of provisioned resources of the computing resources 404 of the computer system 402. In one embodiment, the container instance 416 and the container instance 418 each have a minimum amount of provisioned resources of the computing resources 404 of the computer system 402. It should be noted that the different sizes of the container instances illustrated in FIG. 4 (and in FIG. 6) are included merely to indicate relative differences in provisioned resources of the container instances.

In one embodiment, when the query 422 is received 424 at the resource management service 406 operating on a computer system 402, the resource management service 406 analyzes the query 422 and provisions a set of resources from the computing resources 404 associated with the computer system 402 that are sufficient to process the query 422 as described herein. In one embodiment, the resource management service 406 analyzes the query 422 and, based at least in part on the type and scope of the query 422, provisions a set of resources of the set of computing resources 404 associated with the computer system 402 that are sufficient to process the query 422.

In one embodiment the resource management service 406 instantiates a new container instance 420 provisioned with a set of resources of the set of computing resources 404 associated with the computer system 402 that are sufficient to process the query 422 as described herein.

Figure 5:
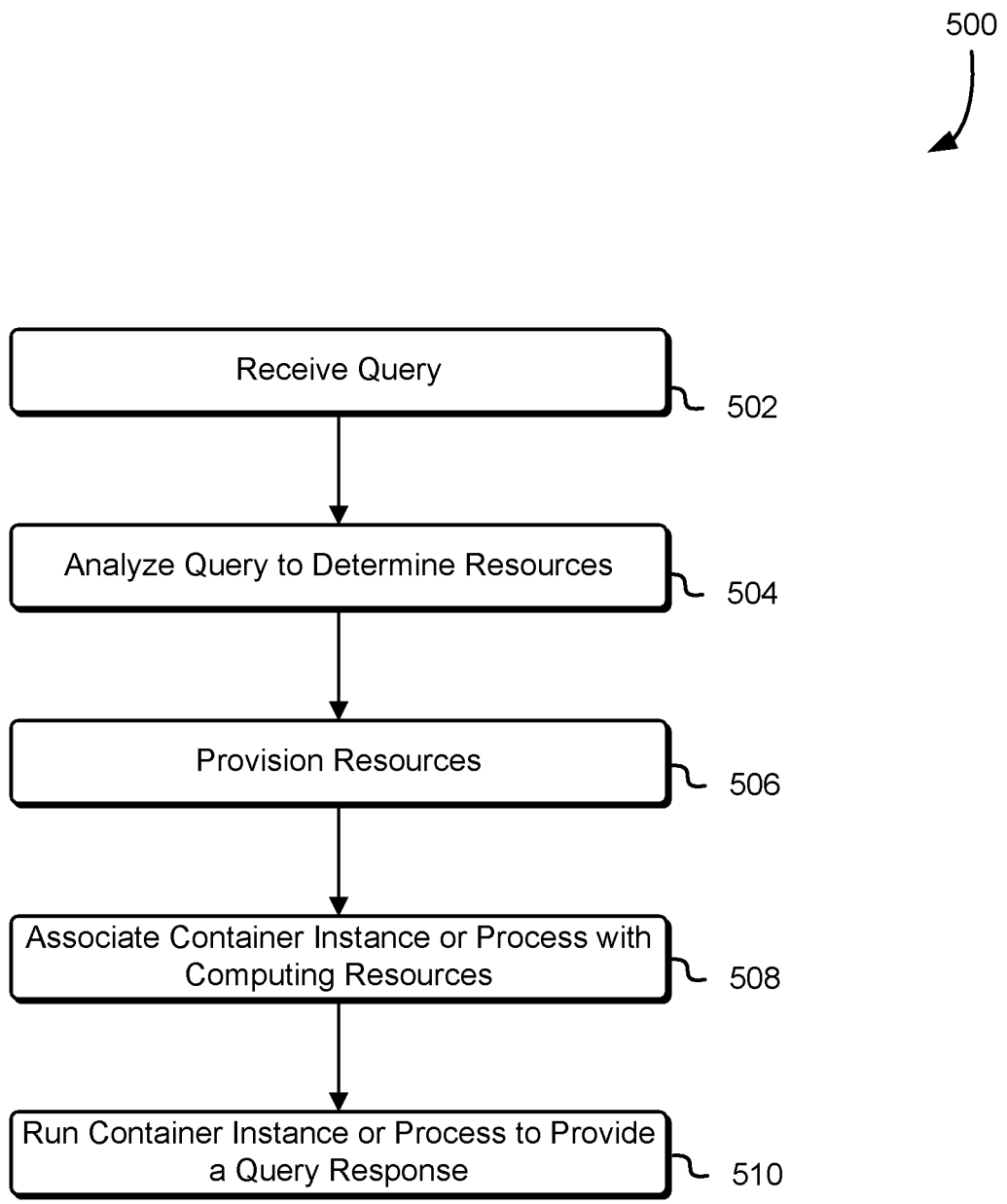
FIG. 5 illustrates an example process for determining resource requirements for a new container instance using a resource management service in accordance with one embodiment.

FIG. 5 illustrates an example process 500 for determining resource requirements for a new container instance using a resource management service as described in connection with FIG. 1 and in accordance with an embodiment. A resource management service such as the resource management service 104 described in connection with FIG. 1 may perform the example process 500 described in connection with FIG. 5. In one embodiment, the resource management service receives 502 a query as described herein. In one embodiment, the resource management service analyzes 504 the query to determine the set of computing resources sufficient to process the query. In an embodiment, the resource management service analyzes 504 the query to determine the set of computing resources sufficient to process the query by comparing the query to previously received queries with characteristics that match one or more characteristics of the query. In an embodiment, the resource management service analyzes 504 the query to determine the set of computing resources sufficient to process the query by comparing the query to a query history that includes a plurality of queries received and analyzed by the resource management service.

In one embodiment, the resource management service provisions 506 a set of computing resources sufficient to process the query by requesting the set of computing resources sufficient to process the query from an operating system operating on a computer system that will host the process or container instance for the query as described herein. In one embodiment, the resource management service provisions 506 a set of computing resources sufficient to process the query from a set of computing resources managed by the resource management service as described herein. In one embodiment, the resource management service associates 508 a container instance with the set of computing resources sufficient to process the query. In one embodiment, the resource management service associates 508 a process with the set of computing resources sufficient to process the query. In one embodiment, the resource management service runs 510 the container instance or process to provide a query response as described herein.

It should be noted that one or more of the operations performed in the example process 500 described in connection with FIG. 5 may be performed in various orders and combinations, including, but not limited to, in parallel.

Figure 6:
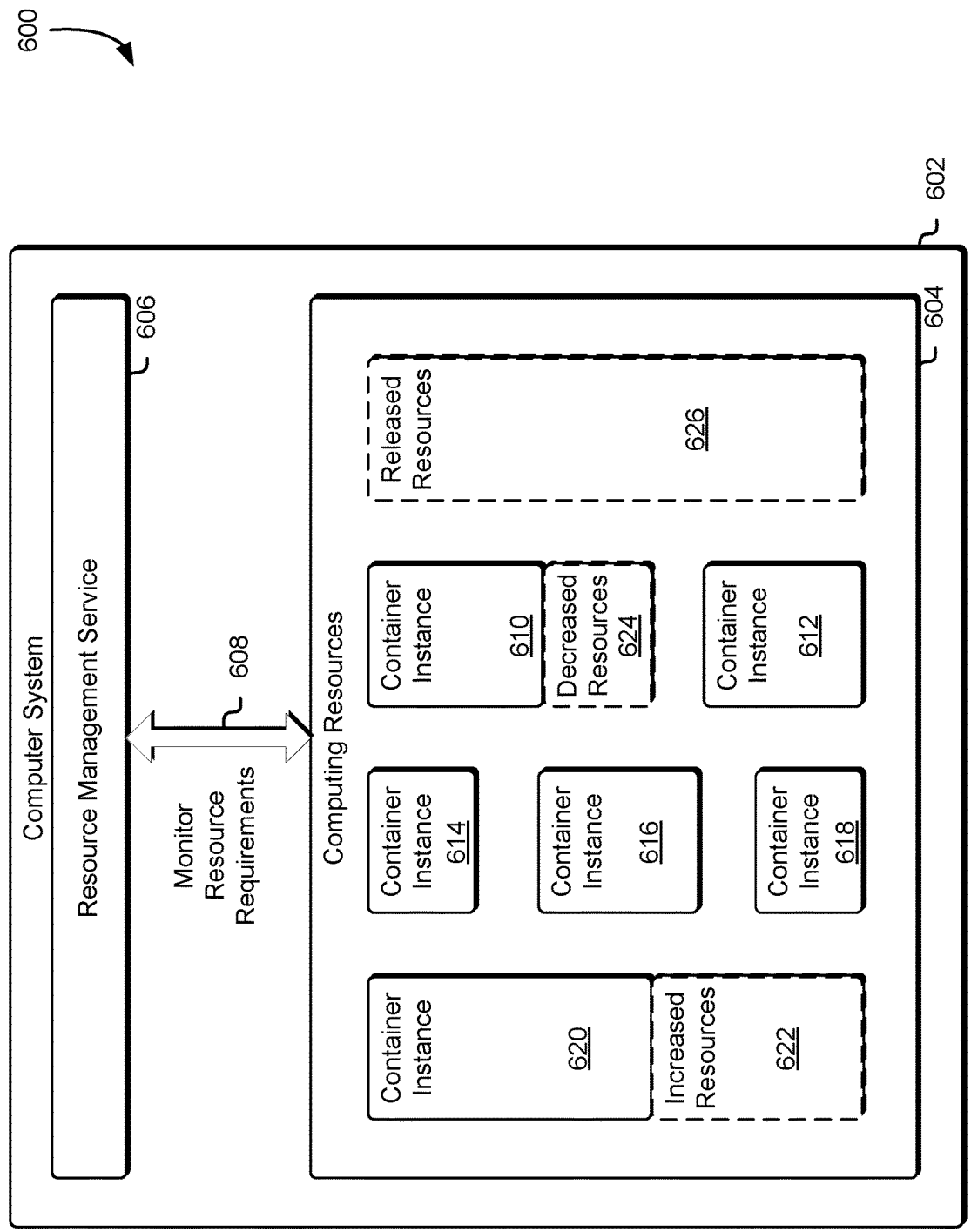
FIG. 6 illustrates an example system where container instances are monitored to determine changes in resource requirements using a resource management service in accordance with one embodiment.

FIG. 6 illustrates an example system 600 where container instances are monitored to determine changes in resource requirements using a resource management service as described in connection with FIG. 1 and in accordance with one embodiment. As illustrated in FIG. 6, in one embodiment, a resource management service 606 operating on a computer system 602 as described herein is monitoring 608 a collection of container instances of the computer system 602 to determine changes in resource requirements for the container instances. Prior to the changes described in connection with FIG. 6, the container instances correspond to the container instances described in connection with FIG. 4 (i.e., the container instance 610 corresponds to the container instance 410, the container instance 612 corresponds to the container instance 412, the container instance 614 corresponds to the container instance 414, the container instance 616 corresponds to the container instance 416, the container instance 618 corresponds to the container instance 418, and the container instance 620 corresponds to the container instance 420). A container instance corresponding to the container instance 408 is not illustrated in FIG. 6.

In one embodiment, the resource management service 606 determines, via the monitoring 608, that a container instance 610 is provisioned with a set of computing resources of the computing resources 604 that is more than an amount of computing resources sufficient to process the query associated with the container instance 610. In one embodiment, the container instance 610 is provisioned with a set of computing resources of the computing resources 604 that is more than the amount of computing resources sufficient to process the query associated with the container instance 610 because the resource management service 606 overprovisioned the container instance 610 when analyzing the query associated with the container instance 610 (i.e., the resource management service 606 provisioned an over-sufficient amount of resources with the container instance 620). In one embodiment, the container instance 610 is provisioned with a set of computing resources of the computing resources 604 that is more than the amount of computing resources sufficient to process the query associated with the container instance because the resources sufficient to process the query associated with the container instance 610 changed during the processing of the query (e.g., the resources sufficient to process the query associated with the container instance 610 decreased during execution of the container instance 610). In one embodiment, the resource management service 606 determines that the container instance 610 is provisioned with a set of computing resources of the computing resources 604 that is more than the amount of computing resources sufficient to process the query associated with the container instance 610 and reduces the resources associated with the container instance 610. In one embodiment, the decreased resources 624 (e.g., the resources disassociated with the container instance 610) are reclaimed by the resource management service 606 so that they may be provisioned to other container instances.

In one embodiment, the resource management service 606 determines, via the monitoring 608, that a container instance 620 is provisioned with a set of computing resources of the computing resources 604 that is less than an amount of computing resources sufficient to process the query associated with the container instance 620. In one embodiment, the container instance 620 is provisioned with a set of computing resources of the computing resources 604 that is less than the amount of computing resources sufficient to process the query associated with the container instance 620 because the resource management service 606 under-provisioned the container instance 620 when analyzing the query associated with the container instance 620 (i.e., the resource management service 606 provisioned an insufficient amount of resources with the container instance 620). In one embodiment, the container instance 620 is provisioned with a set of computing resources of the computing resources 604 that is less than the amount of computing resources sufficient to process the query associated with the container instance because the resources sufficient to process the query associated with the container instance 620 changed during the processing of the query (e.g., the resources sufficient to process the query associated with the container instance 620 increased during execution of the container instance 620). In one embodiment, the resource management service 606 determines that the container instance 620 is provisioned with a set of computing resources of the computing resources 604 that is less than the amount of computing resources sufficient to process the query associated with the container instance 620 and increases the resources associated with the container instance 620. In one embodiment, the increased resources 622 (e.g., the increased resources associated with the container instance 620) are obtained from the available computing resources 604 of the computer system 602 using the provisioning techniques described herein.

In one embodiment, the resource management service 606 determines, via the monitoring 608, that a container instance (e.g., the container instance 408 described in connection with FIG. 4) has completed processing the query and the resources provisioned to the container instance can be released. In one embodiment, the container instance has completed processing the query and the container instance has generated a response to the query. In one embodiment, the container instance has timed out and no response to the query has been generated. In one embodiment, the container instance has reached an error condition and no response to the query has been generated. In one embodiment, when the resource management service 606 determines, via the monitoring 608 that a container instance has completed and the resources provisioned to the container can be released, the released resources 626 (e.g., the resources provisioned to the completed container instance) are reclaimed by the resource management service 606 so that they may be provisioned to other container instances.

It should be noted that, as described above in connection with FIG. 4, the different sizes of the container instances illustrated in FIG. 6 are included merely to indicate relative differences in provisioned resources of the container instances.

Figure 7:
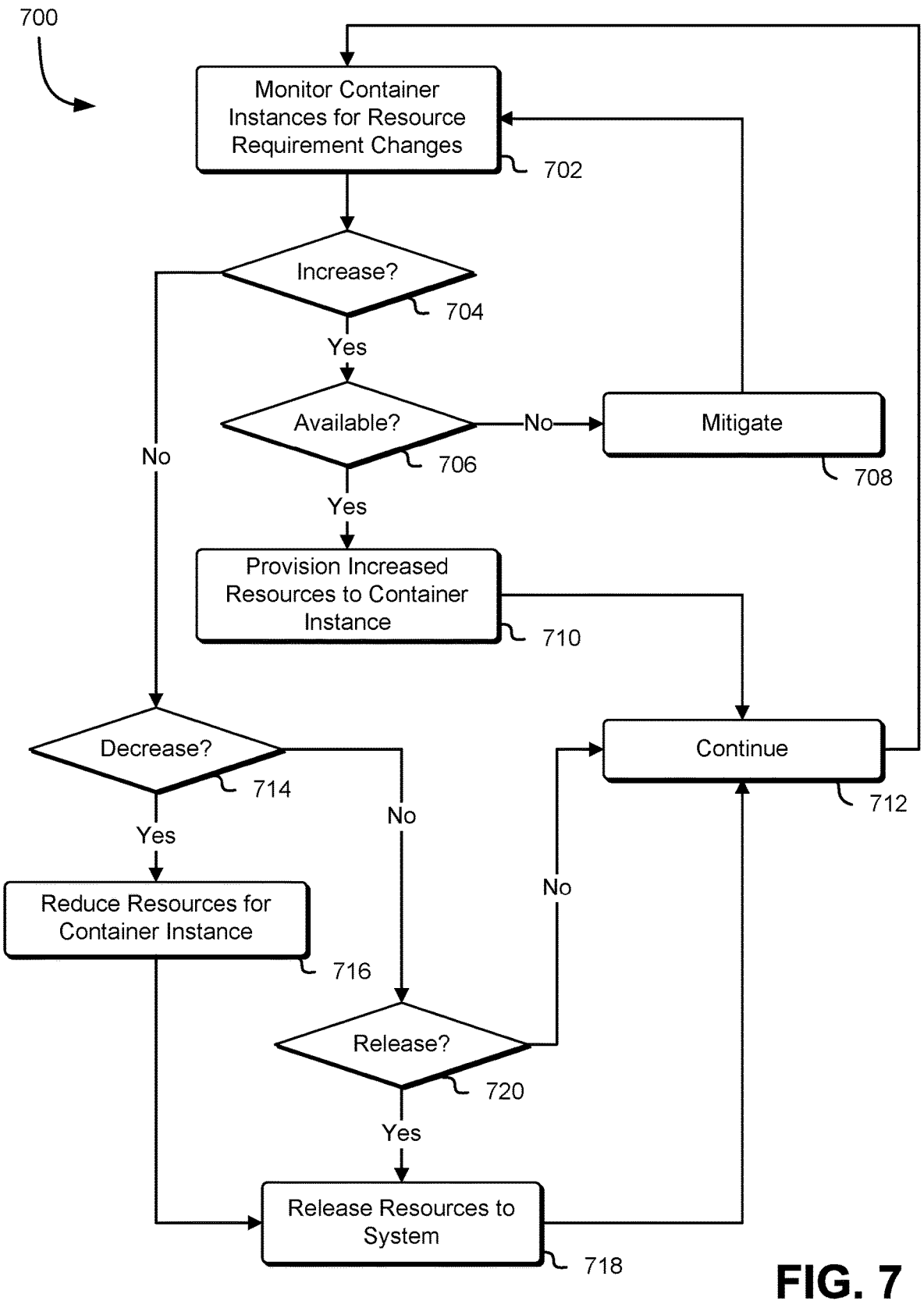
FIG. 7 illustrates an example process for monitoring container instances for changes in resource requirements using a resource management service in accordance with one embodiment.

FIG. 7 illustrates an example process 700 for monitoring container instances for changes in resource requirements using a resource management service as described in connection with FIG. 1 and in accordance with one embodiment. A resource management service such as the resource management service 104 described in connection with FIG. 1 may perform the example process 700 described in connection with FIG. 7. In one embodiment, the resource management service monitors 702 container instances of the computer system for changes in resource requirements as described herein.

In one embodiment, the resource management service determines 704 whether the resource requirements for a container instance have increased. In one embodiment, the resource management service determines 704 that the resource requirements for a container instance have increased when the container instance is provisioned with a set of computing resources that is less than the amount of computing resources sufficient to process the query associated with the container instance. In one embodiment, if the resource management service determines 704 that the resource requirements for a container instance have increased, the resource management service determines 706 whether resources are available to increase the resources provisioned to the container instance. In one embodiment, if the resource management service determines 706 that there are not resources available to increase the resources provisioned to the container instance, the resource management service mitigates 708 the unavailable resource condition as described herein and continues to monitor 702 container instances of the computer system for changes in resource requirements.

In one embodiment, if the resource management service determines 706 that there are resources available to increase the resources provisioned to the container instance, the resource management service provisions 710 the container instance with the increased resources and continues 712 to monitor 702 container instances of the computer system for changes in resource requirements.

In one embodiment, if the resource management service determines 704 that the resource requirements for a container instance have not increased, the resource management service determines 714 whether resource requirements for a container instance have decreased. In one embodiment, the resource management service determines 714 that the resource requirements for a container instance have decreased when the container instance is provisioned with a set of computing resources that is more than the amount of computing resources sufficient to process the query associated with the container instance. In one embodiment, if the resource management service determines 714 that the resource requirements for a container instance have decreased, the resource management service reduces 716 the resources provisioned to the container instance (i.e., reprovisions the container instance with the decreased resources). In one embodiment, the resource management service releases 718 the reduced resources to the computer system so that the resources may be used by the resource management service for other container instances. In one embodiment, the resource management service continues 712 to monitor 702 container instances of the computer system for changes in resource requirements.

In one embodiment, if the resource management service determines 714 that the resource requirements for a container instance have not decreased, the resource management service determines 720 whether to release the resources provisioned to the container instance. In one embodiment, the resource management service determines 720 to release the resource provisioned to the container instance when the container instance has completed, as described herein. In one embodiment, if the resource management service determines 720 to release the resources provisioned to the container instance, the resource management service releases 718 the reduced resources to the computer system so that the resources may be used by the resource management service for other container instances. In one embodiment, the resource management service continues 712 to monitor 702 container instances of the computer system for changes in resource requirements. In one embodiment, if the resource management service determines 720 not to release the resources provisioned to the container instance, the resource management service continues 712 to monitor 702 container instances of the computer system for changes in resource requirements.

It should be noted that one or more of the operations performed in the example process 700 described in connection with FIG. 7 may be performed in various orders and combinations, including, but not limited to, in parallel.

Figure 8:
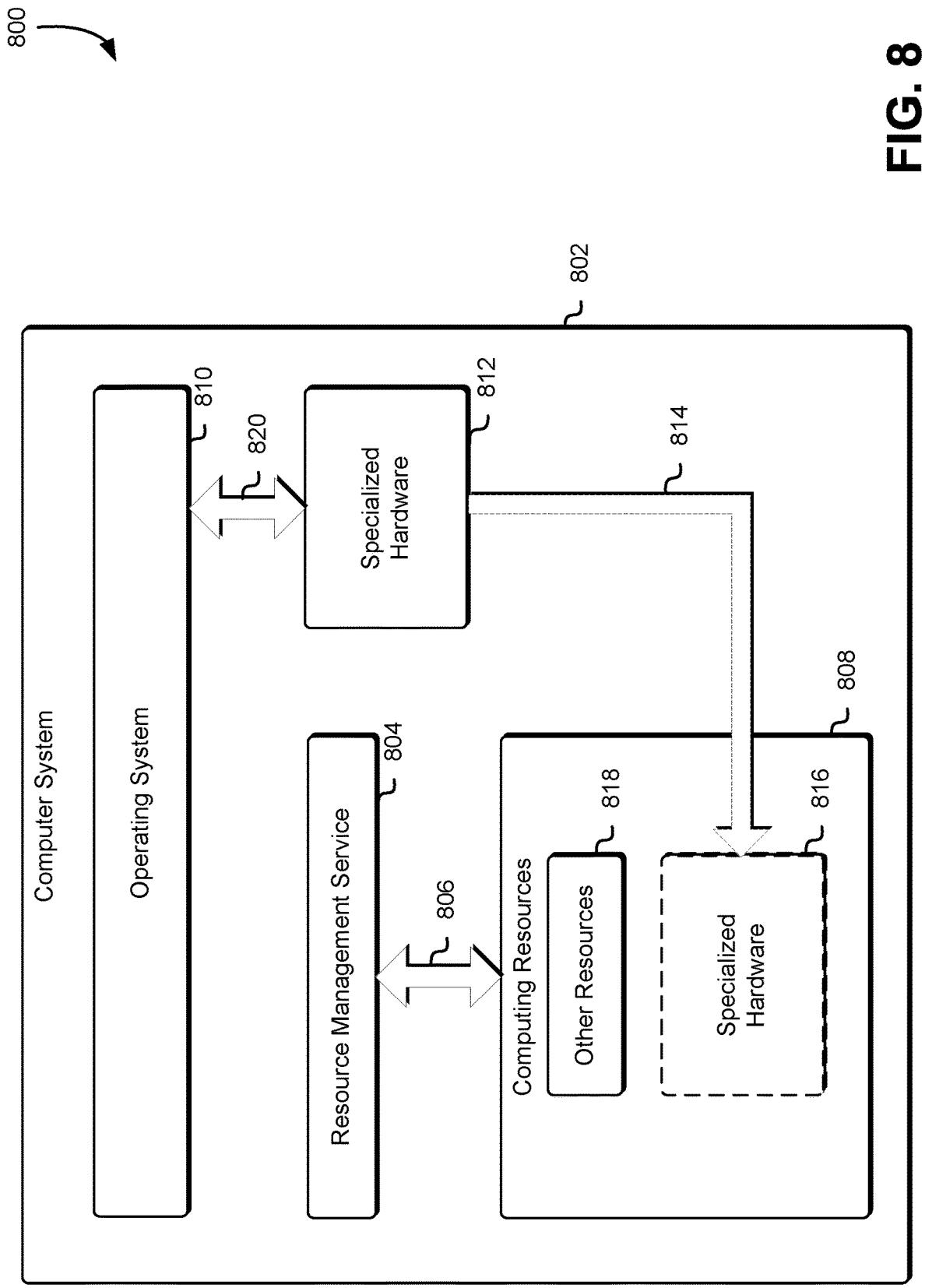
FIG. 8 illustrates an example system where specialized hardware of a computer system is managed using a resource management service in accordance with one embodiment.

FIG. 8 illustrates an example system 800 where specialized hardware of a computer system is managed using a resource management service as described in connection with FIG. 1 and in accordance with one embodiment. In one embodiment, specialized hardware 812 of a computer system 802 such as, for example, a GPU, an ASIC, an FPGA, or a TPM is typically managed 820 by an operating system 810 of the computer system 802. As illustrated in FIG. 8, in one embodiment a resource management service 804 manages 806 the specialized hardware 816 (which corresponds to the specialized hardware 812) with the computing resources 808 as described herein. In such an embodiment, the resource management service 804 obtains control 814 of the specialized hardware 812 from the operating system 810 and manages the specialized hardware 816 with the other resources 818 of the computing resources (e.g., the CPU, memory, storage, network bandwidth, and access to other services of the computing resource service provider).

Figure 9:
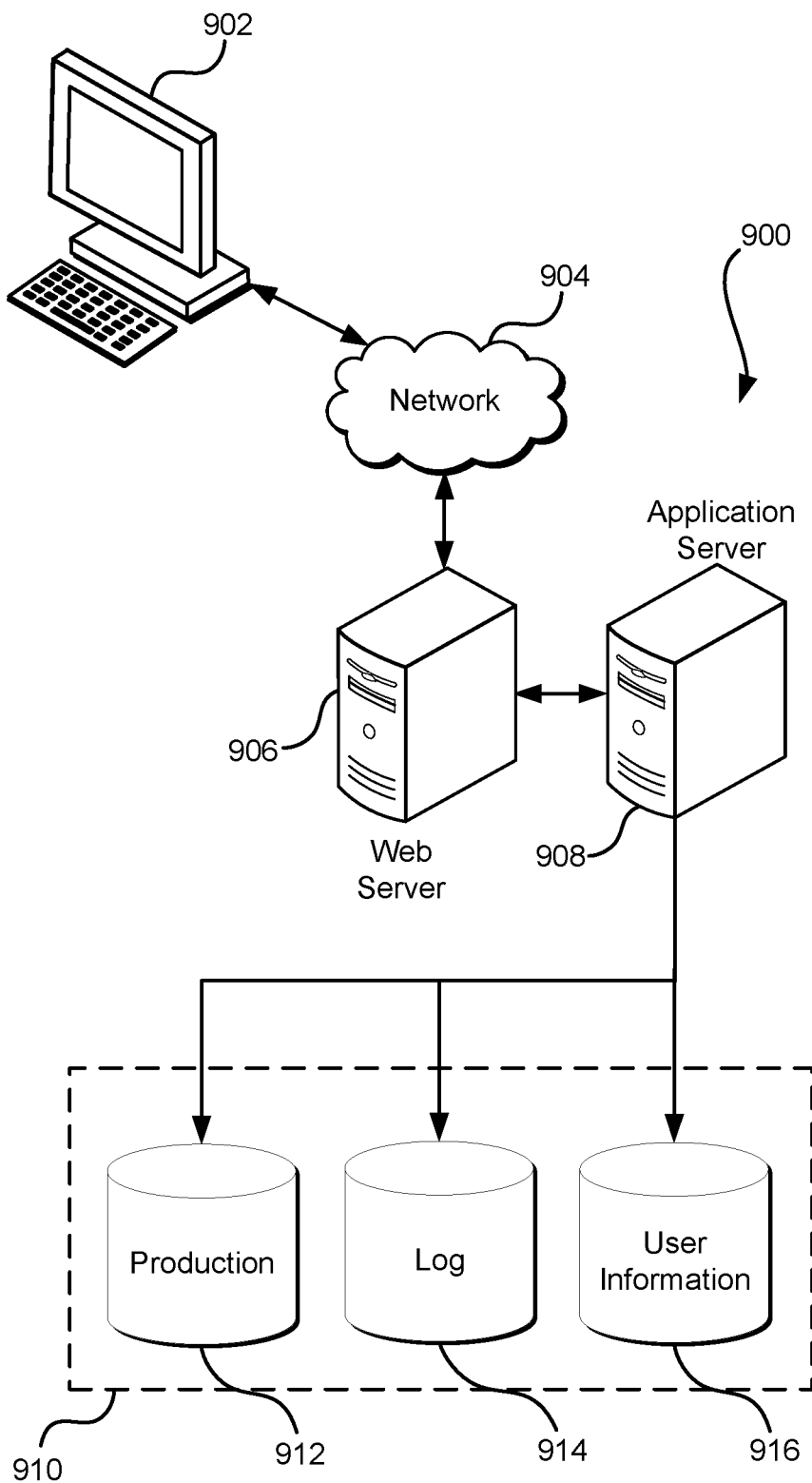
FIG. 9 illustrates a system in which various embodiments can be implemented.

FIG. 9 illustrates aspects of an example system 900 for implementing aspects in accordance with various embodiments. As will be appreciated, although a web-based system is used for purposes of explanation, different systems may be used, as appropriate, to implement various embodiments. The system includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 906 for receiving requests and serving content in response thereto, although for other networks an alternative device serving a similar purpose could be used as would be apparent to one of ordinary skill in the art.

The illustrative system 900 includes at least one application server 908 and a data store 910. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system illustrated in FIG. 9 should be taken as being illustrative in nature and not limiting to the scope of the disclosure.

The various embodiments further can be implemented in a wide variety of operating systems, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a query from a user;
   determining, based at least in part on the query, a minimal set of computing resources that are sufficient to process the query and determined to meet a set of resource requirements associated with the query;
   provisioning at least the minimal set of computing resources sufficient to process the query by obtaining the at least the minimal set of computing resources corresponding to the set of resource requirements from an operating system of a computer system that includes the at least the minimal set of computing resources;
   associating a container instance with the at least the minimal set of computing resources, the container instance being a virtual machine instance that includes one or more of programs, data, and system libraries; and
   running the query in the container instance to provide a query response to the user.

2. The computer-implemented method of claim 1, wherein provisioning the at least the minimal set of resources sufficient to process the query includes:
analyzing the query;
determining a set of resource requirements associated with the query;
obtaining a set of computing resources corresponding to the set of resource requirements; and
providing the set of computing resources corresponding to the set of resource requirements.

3. The computer-implemented method of claim 2, wherein obtaining the set of computing resources corresponding to the set of resource requirements includes obtaining the set of computing resources corresponding to the set of resource requirements from an operating system of a computer system that includes the at least the minimal set of computing resources.

4. The computer-implemented method of claim 2, wherein obtaining the set of computing resources corresponding to the set of resource requirements includes Obtaining the set of computing resources corresponding to the set of resource requirements front a pool of computing resources managed by a resource management service.

5. A system, comprising:
memory to store computer-executable instructions that, if performed by one or more processors, cause the system to at least:
receive a query;
determine, based at least in part on the query, minimal computing resources sufficient to process the query;
provision at least the minimal computing resources sufficient to process the query, and determined to meet a set of resource requirements associated with the query, by obtaining the at least the minimal computing resources corresponding to the set of resource requirements from a computer system that includes the at least the minimal computing resources;
allocate the computing resources to a container instance, the container instance being a virtual machine instance; and
run the query in the container instance associated with the computing resources to provide a query response.

6. The system of claim 5, wherein the query is received from a user of the system.

7. The system of claim 5, wherein:
the query is processed by a container instance; and
the container instance is a virtual machine instance.

8. The system of claim 5, wherein the query is received from a query-based service of a computing resource service provider.

9. The system of claim 5, wherein the computer-executable instructions, if executed, further cause the system to run a resource management service to which the query is received.

10. The system of claim 5, wherein the system is a multi-tenant environment that supports running container instances for a plurality of users of the system.

11. The system of claim 5, wherein the computer-executable instructions further include instructions that, if performed by the one or more processors, cause the system to at least:
monitor the process to identify changes to the computing resources sufficient to process the query; and
as a result of identifying a change in the computing resources sufficient to process the query, at least:
reprovision the computing resources based at least in part on the change in the computing resources sufficient to process the query; and
run the query in the process associated with the change in the computing resources to provide the query response.

12. The system of claim 11, wherein the change in the computing resources sufficient to process the query includes at least one of: an increase in the computing resources sufficient to process the query, a decrease in the computing resources sufficient to process the query, or a release of the computing resources sufficient to process the query.

13. A non-transitory computer-readable storage medium having stored thereon executable instructions that, as a result of being executed by one or more processors of a computer system, cause the computer system to at least:
receive a query from a user;
determine, based at least in part on the query, minimal computing resources that are sufficient to process the query and determined to meet one or more resource requirements associated with the query;
provision at least the minimal computing resources sufficient to process the query by obtaining the minimal computing resources corresponding to the one or more resource requirements from a system that includes the at least the minimal computing resources from an operating system of a computer system that includes the minimal computing resources;
associate a container instance with the at least the minimal computing resources, the container instance being a virtual machine instance that includes one or more of programs, data, and system libraries; and
run the query in the container instance associated with the computing resources to provide a query response to the user.

14. The non-transitory computer-readable storage medium of claim 13, wherein the instructions that cause the computer system to provision the computing resources sufficient to process the query further include instructions that cause the computer system to provision the computing resources sufficient to process the query based at least in part on a predetermined set of resources that are sufficient to process the query.

15. The non-transitory computer-readable storage medium of claim 13, wherein the instructions that cause the computer system to provision the computing resources sufficient to process the query further include instructions that cause the computer system to provision the computing resources sufficient to process the query based at least in part on a set of query types wherein each query type of the set of query types has a corresponding set of resources sufficient to process a query of the query type.

16. The non-transitory computer-readable storage medium of claim 13, wherein the instructions further include instructions that cause the computer system to release the computing resources sufficient to process the query after the query is run in the process associated with the computing resources.

17. The non-transitory computer-readable storage medium of claim 13, wherein the computing resources include at least one of: central processing unit time, central processing unit percentage, memory, network bandwidth, storage, file descriptors, or access to other services of a computing resource service provider.

18. The non-transitory computer-readable storage medium of claim 13, wherein the computing resources include hardware that includes at least one of: a graphics processing unit, an application-specific integrated circuit, a field-programmable gate array, or a trusted platform module.

19. The non-transitory computer-readable storage medium of claim 13, wherein the instructions that cause the computer system to provision the computing resources sufficient to process the query further include instructions that cause the computer system to determine a set of computing resources sufficient to process the query by comparing one or more characteristics of the query to one or more characteristics of one or more previously, received queries with characteristics that match the one or more characteristics of the query.

20. The non-transitory computer-readable storage medium of claim 13, wherein the instructions that cause the computer system to provision the computing resources sufficient to process the query further include instructions that cause the computer system to determine a set of computing resources sufficient to process the query by comparing the query to a query history that includes a plurality of queries received and analyzed by a resource management service.

\* \* \* \* \*